US011544672B2

(12) United States Patent
Wadhwa et al.

(10) Patent No.: US 11,544,672 B2
(45) Date of Patent: Jan. 3, 2023

(54) INSTANT CONTENT NOTIFICATION WITH USER SIMILARITY

(71) Applicant: Microsoft Technology Licensing, LLC, Redmond, WA (US)

(72) Inventors: Mohit Wadhwa, New Delhi (IN); Venkatesh Duppada, Andhra Pradesh (IN); Nadeem Anjum, Santa Clara, CA (US); Nagaraj Kota, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 16/913,387

(22) Filed: Jun. 26, 2020

(65) Prior Publication Data

US 2021/0357869 A1 Nov. 18, 2021

(30) Foreign Application Priority Data

May 15, 2020 (IN) ............................ 202041020664

(51) Int. Cl.

| | |
|---|---|
| ***G06Q 10/00*** | (2012.01) |
| ***G06Q 10/10*** | (2012.01) |
| ***G06F 16/9535*** | (2019.01) |
| ***G06N 20/00*** | (2019.01) |
| ***G06F 16/2457*** | (2019.01) |

(Continued)

(52) U.S. Cl.

CPC ... *G06Q 10/1053* (2013.01); *G06F 16/24578* (2019.01); *G06F 16/9535* (2019.01); *G06N 20/00* (2019.01); *H04L 67/535* (2022.05); *G06K 9/6276* (2013.01); *G06V 40/20* (2022.01)

(58) Field of Classification Search

CPC .......... G06Q 10/1053; G06F 16/24578; G06F 16/9535; G06N 20/00; H04L 67/22; H04L 67/306; G06K 9/6276; G06V 40/20

See application file for complete search history.

(56) References Cited

U.S. PATENT DOCUMENTS 9,251,516 B2 * 2/2016 Rudloff .............. G06Q 30/0625
11,003,997 B1 5/2021 Blackwood et al.

(Continued)

OTHER PUBLICATIONS

Bo, et al., "MatchZoo", Retrieved from: https://github.com/NTMC-Community/MatchZoo, Retrieved on Mar. 6, 2020, 4 Pages.

(Continued)

*Primary Examiner* — Gabrielle A McCormick

(74) *Attorney, Agent, or Firm* — Schwegman Lundberg & Woessner, P.A.

(57) ABSTRACT

In an example embodiment an approximate nearest neighbor framework is provided to query user activity data to find users who are similar to users who have been "matched" to a particular piece of content but who otherwise would not have been matched on their own. The users who have been matched may be called a seed set of users, which are known in real-time, or near-real-time. Use of the approximate nearest neighbor framework allows the system to expand instantly the initial seed set of users to other similar users to rapidly distribute relevant pieces of content to active users, increasing liquidity of the system. Additionally, the target set of specific users to which a notification is sent about the pieces of content can also be expanded, increasing the recall rate.

21 Claims, 10 Drawing Sheets

DETERMINE ANCHOR SET 802
OBTAIN FIRST SET OF PLURALITY OF ACTIVITY DATA CORRESPONDING TO USERS IN ANCHOR SET 804
AVERAGE ACTIVITY DATA AND FORM INTO QUERY VECTOR 806
800
USE APPROXIMATE NEAREST NEIGHBOR ALGORITHM TO IDENTIFY ONE OR MORE NEAREST PIECES OF ACTIVITY DATA 808
MERGE USER CORRESPONDING TO IDENTIFIED ONE OR MORE NEAREST PIECES OF ACTIVITY DATA WITH ANCHOR SET OF USERS 810
APPLY RANKING MODEL TO MERGED SET OF USERS 812
FOR FIRST USER IN MERGED SET
REPEAT FOR NEXT USER IN MERGED SET
SEND NOTIFICATION? 814
Y
N
GENERATE AND SEND NOTIFICATION TO USER 816
MORE USERS IN MERGED SET ? 818
Y
N
END

(51) Int. Cl.
*H04L 67/50* (2022.01)
*G06K 9/62* (2022.01)
*G06V 40/20* (2022.01)

(56) References Cited

U.S. PATENT DOCUMENTS

| | | | | |
|---|---|---|---|---|
| 2005/0216295 | A1* | 9/2005 | Abrahamsohn | G06Q 30/02 705/321 |
| 2008/0139112 | A1* | 6/2008 | Sampath | H04L 67/02 455/3.04 |
| 2011/0258049 | A1* | 10/2011 | Ramer | G06Q 30/0273 705/14.69 |
| 2012/0254098 | A1* | 10/2012 | Flinn | G06F 16/951 706/52 |
| 2013/0282605 | A1* | 10/2013 | Noelting | G06Q 10/10 705/321 |
| 2014/0058954 | A1* | 2/2014 | Perlstein | G06Q 50/188 705/80 |
| 2014/0136613 | A1* | 5/2014 | Chandar | G06F 9/543 709/204 |
| 2016/0034853 | A1* | 2/2016 | Wang | G06F 16/35 705/321 |
| 2016/0255034 | A1* | 9/2016 | Yuan | H04L 51/32 709/206 |
| 2017/0300863 | A1* | 10/2017 | Wang | G06Q 50/01 |
| 2017/0344556 | A1* | 11/2017 | Wu | G06F 16/9035 |
| 2017/0344954 | A1* | 11/2017 | Xu | G06F 16/242 |
| 2017/0364596 | A1* | 12/2017 | Wu | G06Q 30/0205 |
| 2018/0060822 | A1* | 3/2018 | Hou | G06Q 10/1053 |
| 2018/0189739 | A1* | 7/2018 | Kenthapadi | G06F 16/9535 |
| 2018/0248976 | A1 | 8/2018 | Gibson et al. | |
| 2019/0095868 | A1* | 3/2019 | Zhang | G06Q 50/01 |
| 2019/0191200 | A1 | 6/2019 | Panchaksharaiah et al. | |
| 2019/0349439 | A1 | 11/2019 | Anders | |
| 2021/0065131 | A1* | 3/2021 | Bixler | G06Q 10/1053 |
| 2021/0081476 | A1* | 3/2021 | Weinstein | G06F 16/9535 |
| 2021/0209643 | A1 | 7/2021 | Manoharan et al. | |
| 2021/0357784 | A1 | 11/2021 | Kota et al. | |
| 2022/0217214 | A1 | 7/2022 | Ochiai et al. | |

OTHER PUBLICATIONS

Bobadilla, et al., "Recommender Systems Survey", In Journal of Knowledge-Based Systems, vol. 46, Jul. 1, 2013, pp. 109-132.

Borisyuk, et al., "CaSMoS: A Framework for Learning Candidate Selection Models over Structured Queries and Documents", In Proceedings of the 22nd ACM SIGKDD International Conference on Knowledge Discovery and Data Mining, Aug. 13, 2016, pp. 441-450.

"Notice of Allowance Issued in U.S. Appl. No. 16/913,176", dated Aug. 30, 2022, 16 Pages.

* cited by examiner

INSTANT CONTENT NOTIFICATION WITH USER SIMILARITY

TECHNICAL FIELD

The present disclosure generally relates to technical problems encountered in large computer networks. More specifically, the present disclosure relates to the instant notification of job listings posted to an online network using job-seeker similarity.

BACKGROUND

The rise of the Internet has occasioned two disparate yet related phenomena: the increase in the presence of social networking services, with their corresponding user profiles visible to large numbers of people, and the increase in the use of these social networking services to provide content. An example of such content is a social media post, where a user can post information, such as text, pictures, videos, articles, etc. for other users to view.

Social networking services act to ensure that user engagement, meaning the amount of time and effort a user spends engaging with the social networking service, is high. The result is that social networking services often offer multiple different types of content and multiple different opportunities to interact with data in different ways. These different opportunities may be called "channels." Content is typically served to users through these channels.

One popular use of social networking services is for advancement of professional careers. A social networking service may allow, for example, job listings or other relevant professional content to be posted to the social networking service for perusal by its members. As such, it becomes important that the corpus of content be continually fresh, and also that it provide fair liquidity among users, namely that users who might be interested in the content (and in the case of job listing content are qualified for the corresponding job) are mostly all able to equally access and/or be alerted to the content.

The technical problems involved are somewhat inverse to those in recommender systems. In recommender systems, users coming to a site are provided a set of recommended items, such as content to view. In the present case, however, the system desires to find users who might be best served with a notification of a new piece of content.

Traditionally these technical problems have been addressed via search systems, where users are indexed as documents and the attributes of a piece of content are used to retrieve matching users, who are then each scored using a machine learning ranking model trained to maximize the probability of a high "utility" by matching the user and the piece of content. In the context of job listings, this utility may be measured in certain types of interactions, such as "applies" to jobs, or views or saves (or any combination thereof). The scores are used to rank the users, and the content may be pushed to highly ranked users.

An issue arises, however, in that the matching process may be too limiting and may not fully capture all of the users who may be interested in a particular piece of content. The matching process relies upon attributes of the content being matched up with attributes of a user profile of a user based on a matching criteria, but both content and user profiles can be incomplete or inaccurate. Additionally, user intent may not be captured by a user profile. In the case of job listings, certain users may be actively seeking a job (called job seekers) while others may have limited or no desire to change jobs. Furthermore, even in the subset of users actively seeking a job, they may only be actively seeking a particular type of job, and that particular type of job may not match their user profile. For example, a computer programmer may have a burning desire to open a restaurant and may wish to find a job as an assistant manager of a restaurant to learn the trade, but may have no culinary or restaurant experience or skills listed in their user profile.

What is needed is a solution that addresses these technical issues.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment an approximate nearest neighbor framework is provided to query user activity data to find users who are similar to users who have been "matched" to a particular piece of content but who otherwise would not have been matched on their own. The users who have been matched may be called a seed set of users, which are known in real-time, or near-real-time. In some alternative embodiments the seed set may be determined using a different approach, such as the set of members who have applied or that have applied and heard back from a recruiter. Nevertheless, the use of the approximate nearest neighbor framework allows the system to expand instantly the initial seed set of users to other similar users to rapidly distribute relevant content to active users, increasing liquidity of the system. Additionally, the target set of specific users to which a notification is sent about the piece of content can also be expanded, increasing the recall rate.

Furthermore, this approximate nearest neighbor framework is scalable to index hundreds of millions of vectors of user activity data.

DESCRIPTION

While the proposed methodology may be utilized for a number of different types of communications, in an example embodiment it is applied specifically to the case of job suggestions. For ease of discussion, the job suggestion embodiment will be described throughout this document, but the claims shall not be interpreted as limiting the scope of protection to job suggestions unless explicitly recited.

Figure 1:
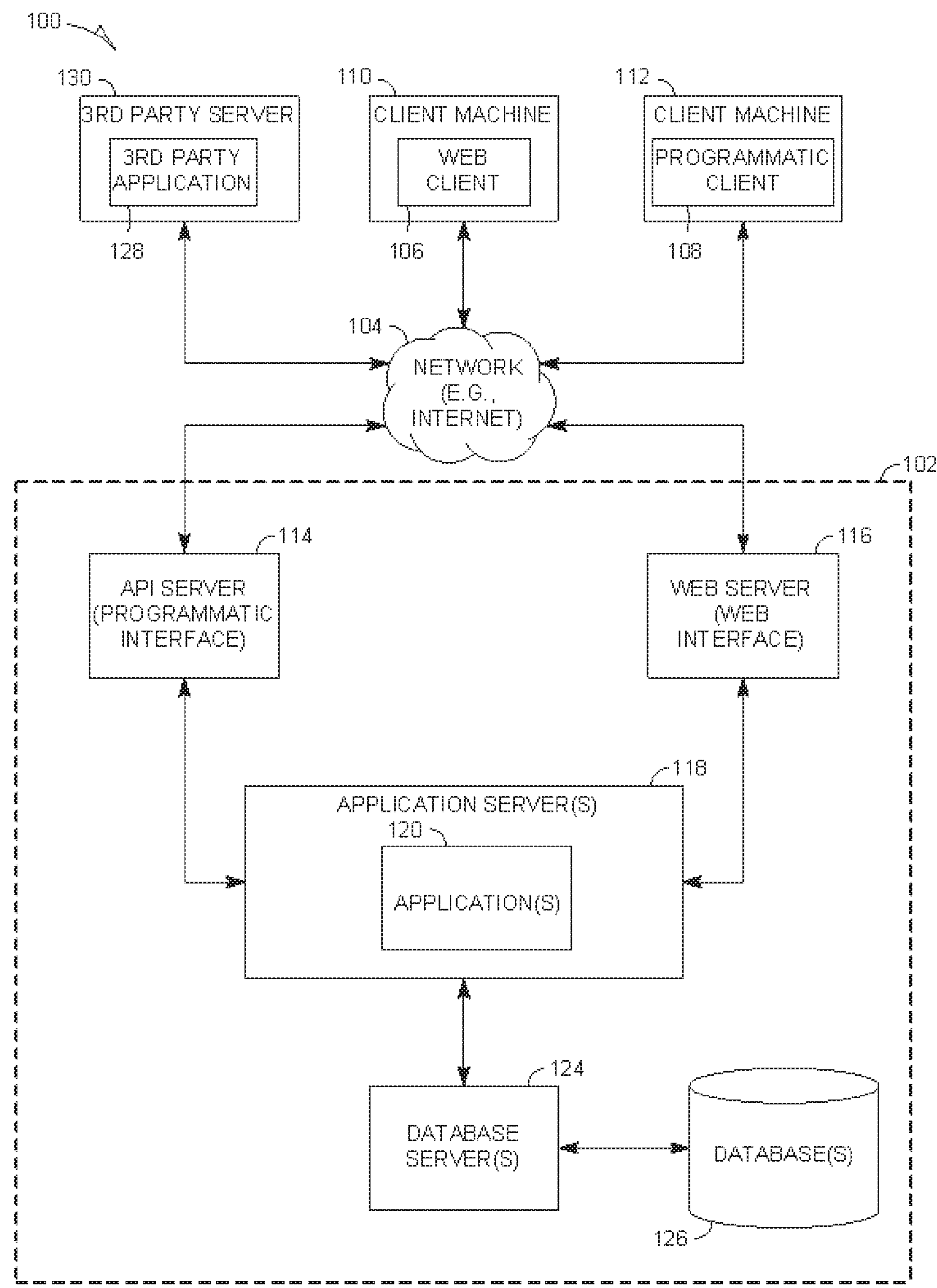
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
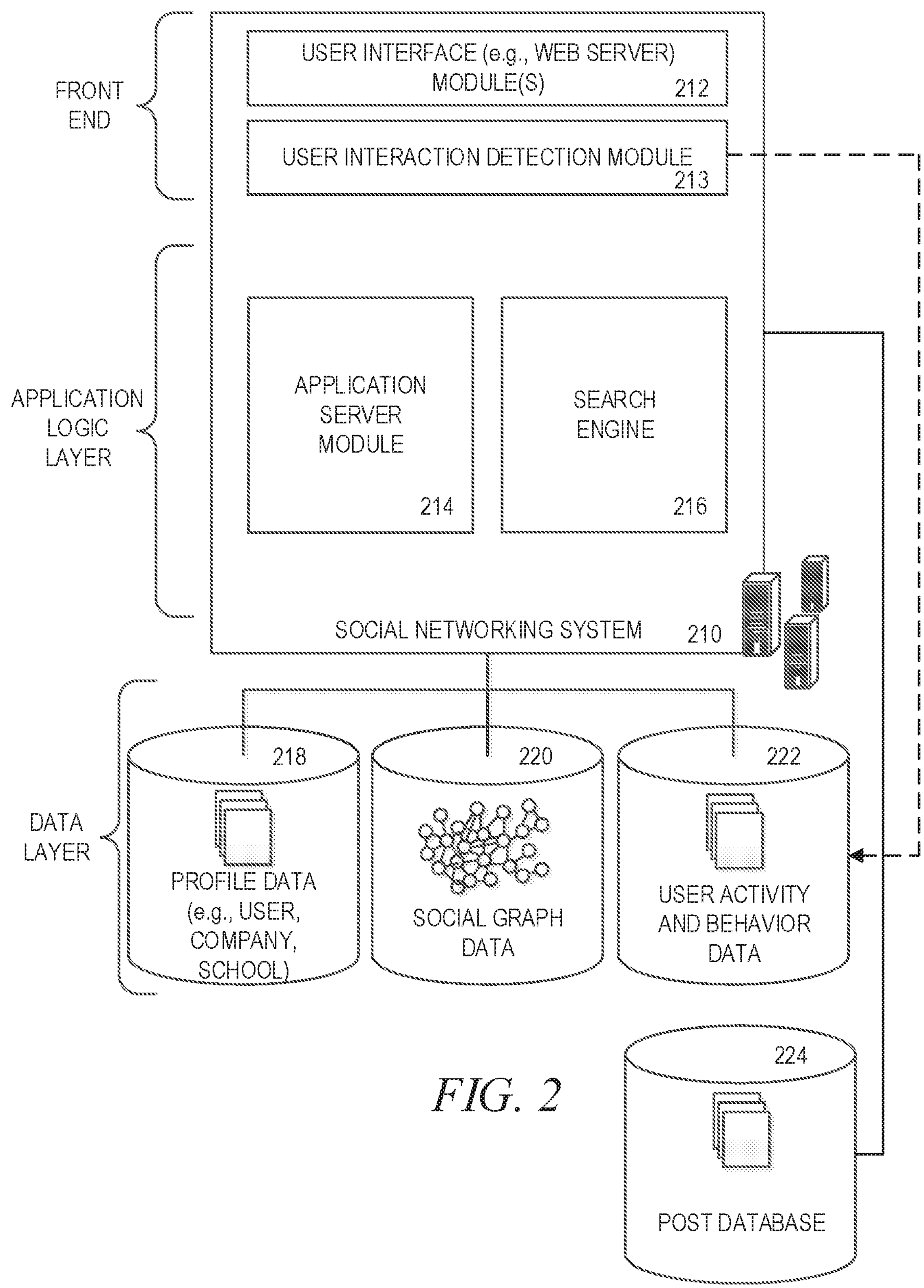
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level, or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

As described above, embodiments of the present invention may be utilized for ranking and/or selection of social media posts to display to users. These social media posts may be directly or indirectly generated from user activity within the social networking service, and may be stored in post database 224. Examples of social media posts directly generated from user activity include the users themselves posting text, image, or video information as a post. Examples of social media posts indirectly generated from user activity include the social networking service itself generating the post when the user has a change in their profile, or when the user is mentioned in an article, etc.

Figure 3:
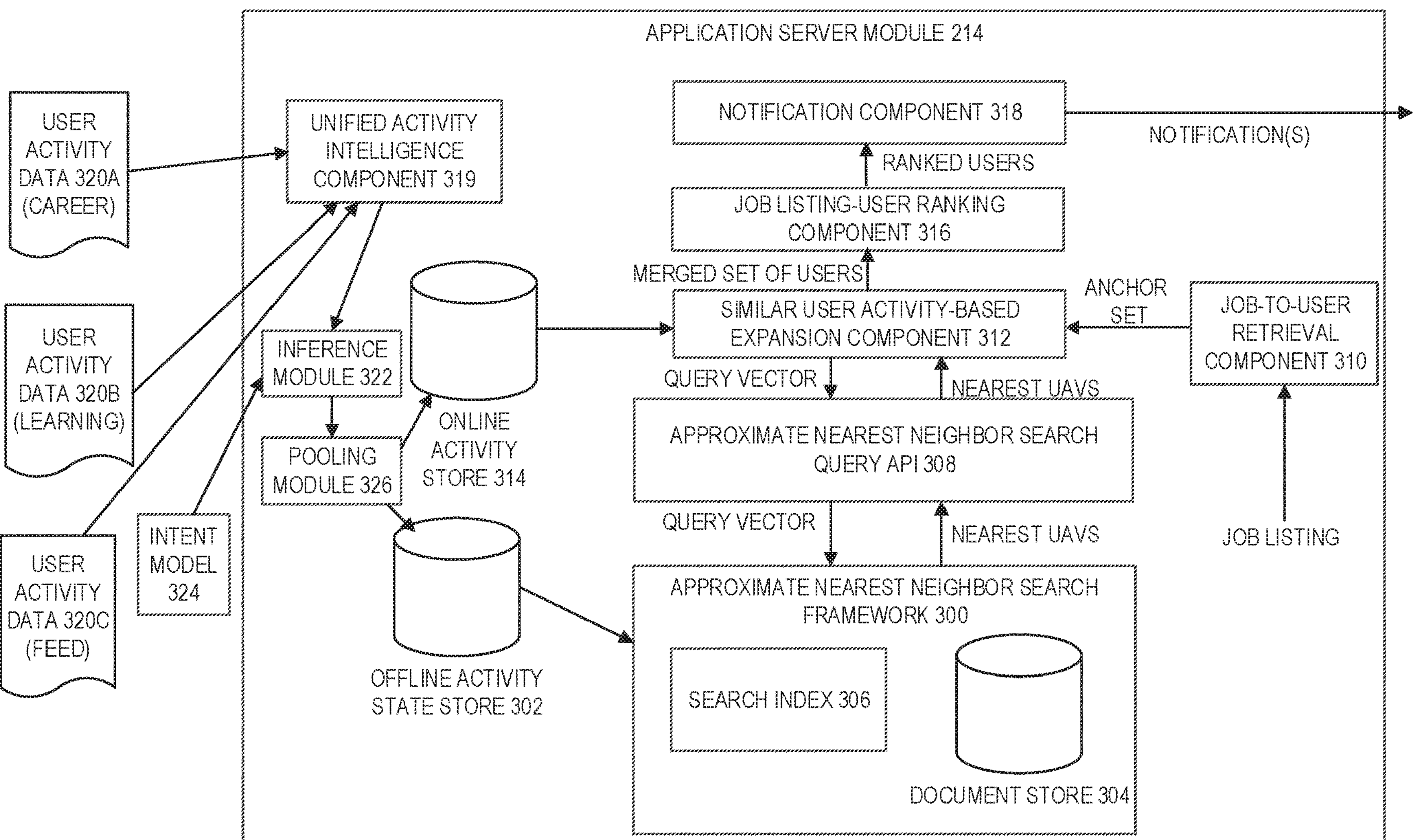
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

The application server module 214 includes an approximate nearest neighbor search framework 300. The purpose of the approximate nearest neighbor search framework 300 is to build a search index offline and provide support for online retrieval of nearest neighbors. Offline in this context means performed without regard for whether a particular user is logged in and activity using the online network. For example, the search index may be built daily regardless of which, if any, users happen to be logged in and using the online network. Online in this context means when a particular user is logged in and creating activity using the online network, so that the online retrieval of nearest neighbors for the particular user is performed during the particular user's session.

The approximate nearest neighbor search framework 300 may obtain activity data from an offline activity state store 302. The approximate nearest neighbor search framework 300 then stores the activity information that is going to be used to build the index in a document store 304.

The approximate nearest neighbor search framework builds a search index 306 using the activity data from the document store 304. In an example embodiment, the search index 306 is in the form of a hierarchical navigable small world (HNSW) index graph. The HNSW index graph keeps both long range connections to far neighbors and short range connections to near neighbors. The connections are organized into a hierarchy. The long-range links are maintained on the top layer while the short-range links are maintained on the lower layer. The search, when fulfilled, is fulfilled from the top layer to the lower. This allows for a "coarse-to-fine" search that provides better logarithmic complexity scaling than if the search was based on a flat graph.

Figure 4:
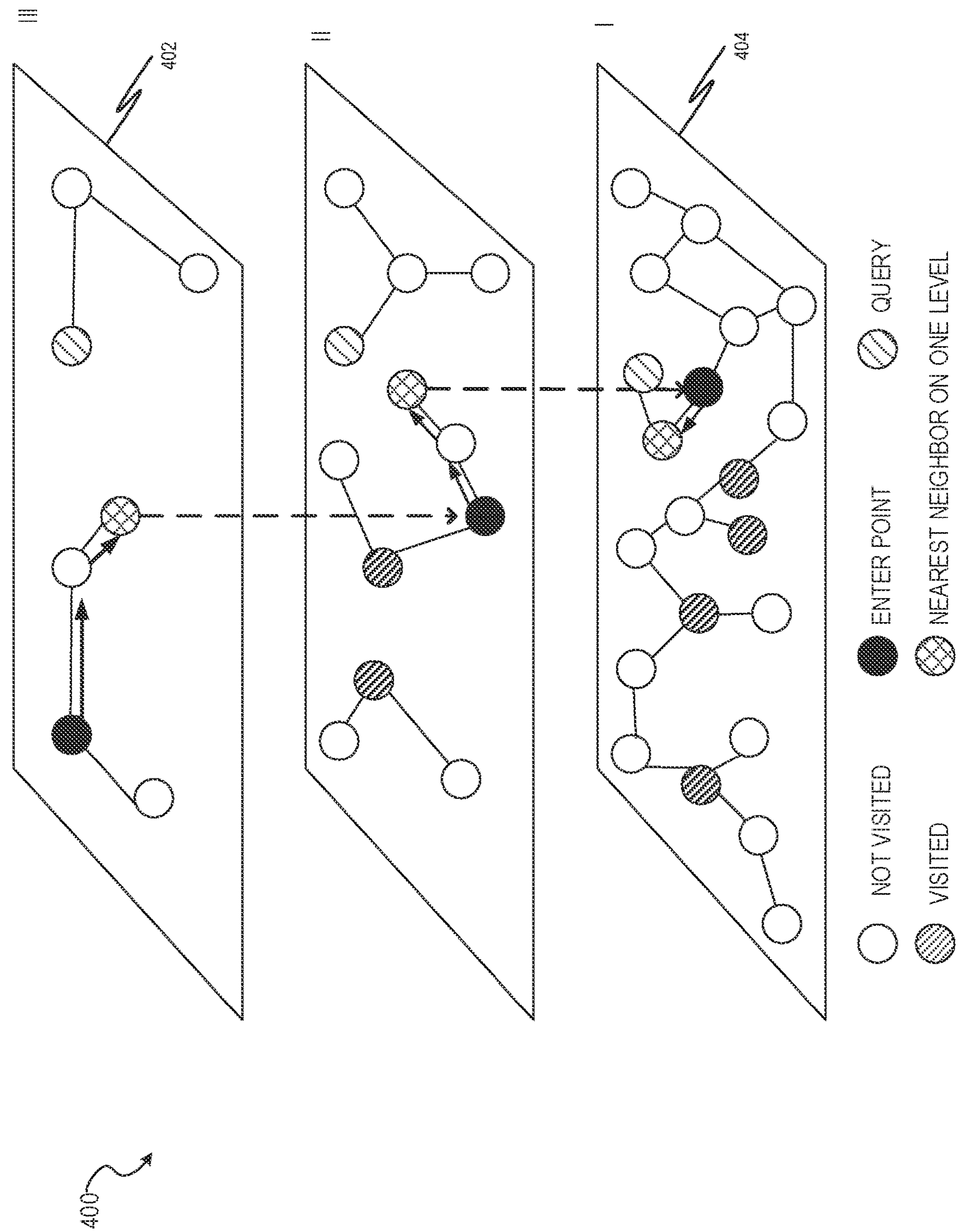
FIG. 4 is a diagram illustrating the hierarchical structure of HNSW, in accordance with an example embodiment.

FIG. 4 is a diagram illustrating a hierarchical structure 400 of HNSW, in accordance with an example embodiment. As seen in this figure, the search begins from a fixed sample on the top layer 402. The nearest-neighbor search explores the k-nearest neighbor list of a visited vertex and descends greedily to a closer neighbor, if one exists. The search on one layer stops as no closer neighbor is found. The discovered closest neighbor on the current layer is treated as the starting point of the search on the lower layer. Such a top-down greedy search continues until it reaches the bottom layer. A greedy search is one that at each stage selects the locally best choice of the available choices (as opposed to, for example, considering which choice is best for all the stages). On the bottom layer 404, the search takes the closest neighbor found from the upper layer as the starting point. The search moves towards a query each time by expanding neighbors of vertices in a maintained top-k nearest neighbor list. The top-k list is updated as long as any closer top-k neighbor is found. The recall of the search procedure is controlled by the parameter k. The parameter k may be selected by an administrator based on the number of users the administrator wishes to receive each notification.

Construction of the HNSW index graphs follows a similar procedure as the nearest neighbor search. Each user's activity data is treated as a query against the HNSW index graphs under construction. HNSW index graphs are incrementally built by repetitively inserting user activity data into the hierarchy. The probability that a query is inserted into a layer is regularized by an exponentially decaying probability distribution. The lower the layer is, the higher the chance that the query is inserted. On the layer that a query sample should be inserted, the discovered M neighbors are kept in a neighbors list for the sample. Accordingly, the query is possibly inserted into the neighbors lists of these M neighbors. Parameter M controls the scale of the neighborhood list. As with parameter k, parameter M may be selected by an administrator based on the number of users the administrator wishes to receive each notification.

Returning to FIG. 3, an approximate nearest neighbor search query Application Program Interface (API) 308 provides a service to fetch the nearest neighbor of a given query vector and return the results. In an example embodiment, the approximate nearest neighbor search query API 308 is a Rest.li service.

At runtime, a recently posted job listing may be passed to a job-to-user retrieval component 310, which retrieves users matching the job listing. This matching may be performed by using a matching criteria, such as assigning a relevance score for each retrieved user with respect to the job listing, based on, for example, a comparison of attributes in the user's profile and attributes of the job listing. For example, if the job listing indicates a certain skill is needed for the job and the user has that skill listed in the user's profile, that would be indicative of a match. Location and job title are additional attributes that could be used for matching.

The result is a set of matching users that may be termed an "anchor set". This anchor set is then passed to a similar user activity-based expansion component 312, which includes an expansion mechanism and logic to take the anchor set and expand it using the approximate nearest neighbor search query API 308. The expansion may be performed using one of two possible expansion algorithms, both of which utilize data from an online activity store 314. The online activity store 314 stores activity data much like the offline activity state store 302. The difference is the offline activity state store 302 is used when building the index, as the index is built offline, whereas the online activity store 314 is used to fetch activity data for the anchor set, since notifications are sent in an online manner.

Figure 5:
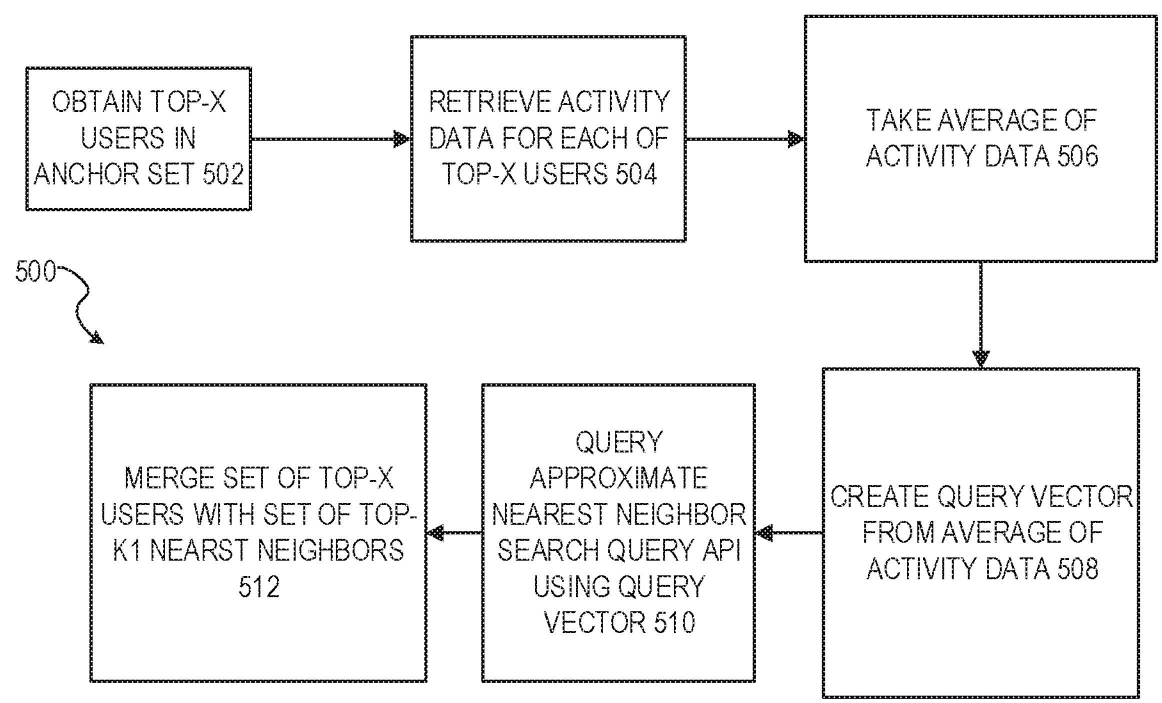
FIG. 5 is a flow diagram illustrating a method for performing a first expansion algorithm, in accordance with an example embodiment.

FIG. 5 is a flow diagram illustrating a method 500 for performing a first expansion algorithm, in accordance with an example embodiment. At operation 502, the top-x users in the anchor set, as determined based on the relevance score from the job-to-user retrieval component 310, are obtained. In an example embodiment, this relevance score may be based on a comparison of profile data to the job listing (e.g., do they have matching terms in key fields, such as job title, location, and skills). Here, x may be set by an administrator based on a desired number of users in an initial set of users to receive notifications, to be used as a basis for expansion to additional users. At operation 504, for each user in the top-x users, activity data are retrieved from the online activity store 314. At operation 506, the average of these pieces (across all users in the top-x) of activity data is taken. At operation 508, the average activity data is used to create a query vector. In some embodiments, the activity data is a representation of user activity as an embedding or vector, and as such the averaging may involve averaging embeddings. This process also involves taking the average activity data and inserting it into a vector data structure (a vector being a one-dimensional array).

At operation 510, the approximate nearest neighbor search query API 308 is queried using the query vector, which returns the top-k1 nearest neighbors, in the form of user identifications. The nearest neighbors are with respect to the passed query vector, and the k parameter is passed as a parameter to the API as k1 (which will later be differentiated from a different value for k, k2, in a different algorithm). At operation 512, the set of top-x users is merged with the set of top-k1 nearest neighbors. The result is a combined list of users containing both users who were present in the top-x users and users present in the top-k1 nearest neighbors.

Figure 6:
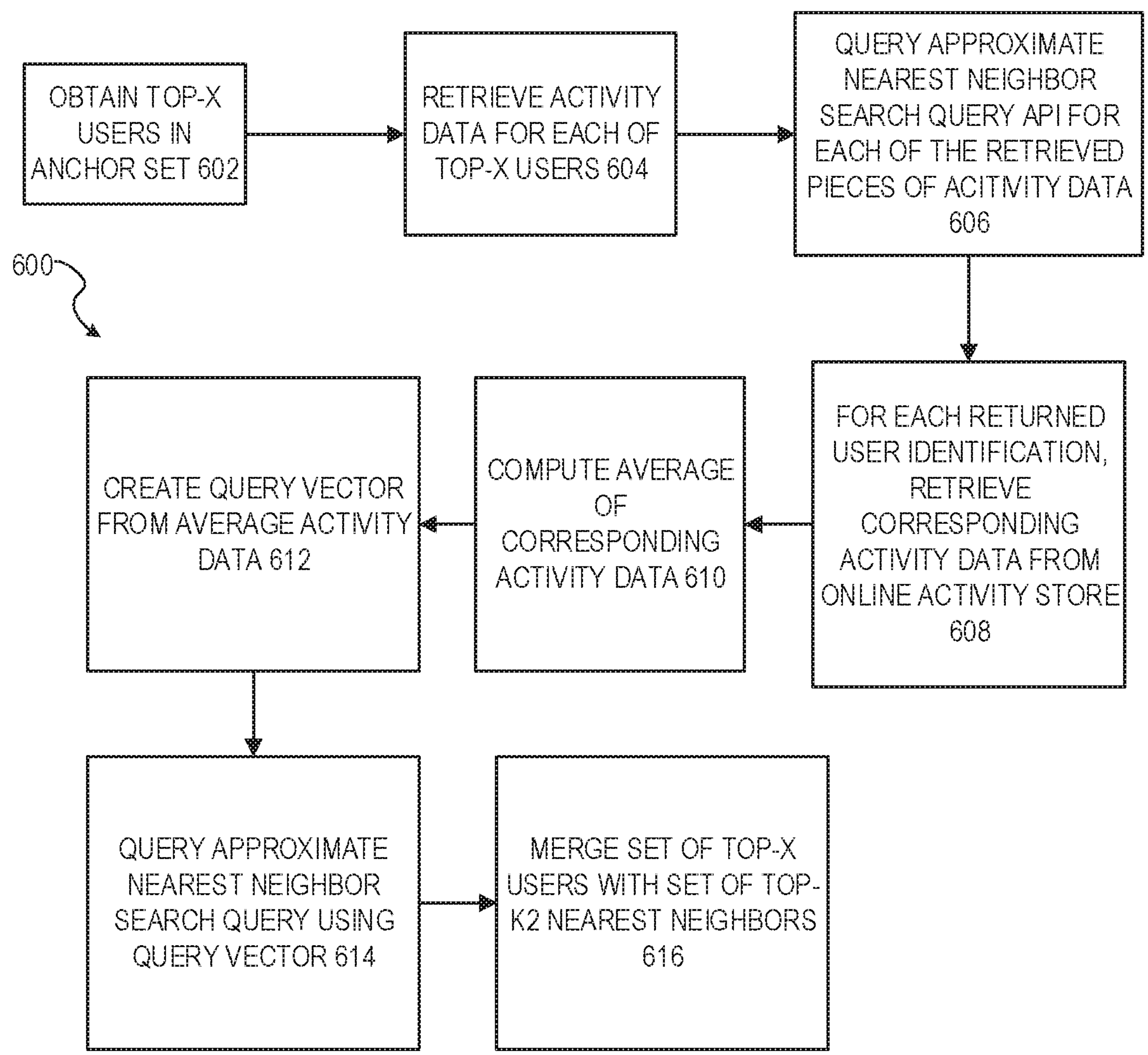
FIG. 6 is a flow diagram illustrating a method for performing a second expansion algorithm, in accordance with an example embodiment.

FIG. 6 is a flow diagram illustrating a method 600 for performing a second expansion algorithm, in accordance with an example embodiment. This second expansion algorithm is an alternative expansion algorithm from the one performed in FIG. 5. At operation 602, the top-x users in the anchor set, as determined based on the relevance score from the job-to-user retrieval component 310, are obtained. In an example embodiment, this relevance score may be based on a comparison of profile data to the job listing (e.g., do they have matching terms in key fields, such as job title, location, and skills). At operation 604, for each user in the top-x users, activity data are retrieved from the online activity store 314. At operation 606, for each of the retrieved pieces of activity data, the approximate nearest neighbor search query API 308 is queried, which returns the top-k nearest neighbors for each piece of activity data. Hence, the total number of returned user identifications from the approximate nearest neighbor search query API 308 here is x*k.

At operation 608, for each of these x*k user identifications, corresponding activity data are retrieved from the online activity store 314. At operation 610, the average of the pieces of activity data retrieved in operation 608 is computed. At operation 612, a query vector is created from the average activity data.

At operation 614, the approximate nearest neighbor search query API 308 is queried using the query vector, returning the top k2 nearest neighbors (as parameter k is passed as value k2). At operation 616, the set of top-x users is merged with the set of top-k2 nearest neighbors.

Referring back to FIG. 3, the merged set of users, which represents the expanded set of users, is passed to a job listing-user ranking component 316, which ranks the users in the merged set of users. The ranking, as will be seen, will be used to determine whether a corresponding user is sent a notification about the job posting. In an example embodiment, the ranking algorithm may be a machine learned model that outputs a score for each user based on a combination of input features. These features may be indicative of the probability that the user will apply for the corresponding job or otherwise interact with the job listing. Features may include user profile attributes, such as employer, skills, title, locations, etc., activity vectors, job listing attributes, such as employer, skills, industry, functions, etc., and context attributes, such as user segment, time, device, etc. In an example embodiment, the machine learned model may be trained using a supervised machine learning algorithm, such as an XGBoost algorithm. In one specific example embodiment, the machine learned model may be a neural network.

A notification component 318 then utilizes the ranking (and the scores derived during the ranking process) and determines to which users to send a notification about the job listing. In an example embodiment, users whose ranking scores exceed a preset threshold are sent the notification. This preset threshold may be selected based on a minimum desired probability of applying for the job listing in order to send a notification. For example, an administrator may decide that only users who have at least a 50 percent chance of applying for a job listing should be sent a notification about the job listing. In another example embodiment, a set number of highest-ranked users are sent the notification. In another example embodiment, other factors, such as the number of job listing notifications the user has received recently, are used to determine whether to send a user a notification. For example, a preset maximum number of job listing notifications to a user per period (e.g., hour, day, week) may be used and a user may only receive a notification if the preset maximum for the user has not been reached.

The activity data themselves may be formulated using a number of different techniques. In a simple case, the activity data may simply be pieces of activity data that have been gathered from multiple channels without augmentation or alteration. For example, information about a how a user interacted with various content items in a feed may be added to a piece of activity data for the user along with information about how a user interacted with a user interface to perform a job search and interact with the results.

In another example embodiment, the activity data includes additional information that has been added to the information from the channels in order to represent user intent with respect to the various activities undertaken via the various channels.

Traditionally, machine learning algorithms have been utilized to aid in understanding user intent with respect to content. Specifically, training data containing examples of content that users did or didn't interact with are used as positive and negative signals, respectively, when training a machine learned model using a machine learning algorithm. These models, however, are domain/channel specific. For example, a model may be developed for the search channel, but this model does not apply to the careers channel. Not only are the models not transferrable to different channels, but the training data also is not transferrable to different channels. For example, a user clicking on a job posting may have a clear meaning as a piece of training data in a model trained for a careers channel, but such an action may not have as clear a meaning in a feed channel, or a learning channel. A user may perform many of these types of actions in many different channels in a single channel, and yet only a subset are utilized for an individual channel's model.

As a result, each channel, which really represents a different domain, is performing its own modeling of member interests based on a partial view of actions taken during a session. Not only does this lead to inefficiencies and inaccuracies in the models, it also wastes a valuable opportunity to capture cross-channel single-session data. For example, if a user clicks on a job listing and then also clicks on a member of the social networking service after a member search in the same session, then those actions may very well have been related, and this relationship is lost if these actions are only considered independently by their respective channel models.

In an example embodiment, user interactions with a graphical user interface are modeled to derive an efficient representation that is highly available through a framework. This representation enables downstream analysis as to the relevancy of the user interactions through libraries leveraging standardized activity representations. With these components, it becomes possible to derive user intent in a modular fashion, domain by domain, while decoupling many system aspects, while also providing high capacity and precise intent information to leverage for personalization.

At a high-level, the objective of an example embodiment is to understand and represent user activities to enable real-time or near-real-time personalized experiences across a social networking service. A base layer unifies and sessionizes users' heterogeneous cross-channel site activities. A high-capacity efficient intent-representation called a Unified Activity Vector (UAV) can then be obtained using an activity embedding learning framework, leveraging natural language processing and deep-learning machine learning algorithms. The UAVs are stateful, and may be updated on a periodic basis (e.g., daily). They may be persisted to a key-value store so as to be highly available online.

UAVs can be leveraged to enable multiple downstream relevance tasks, such as query suggestions, identifying entities of interest, and identifying other users who have similar intent to a particular user. The latter may be retrieved using a Hierarchical Navigable Small World (HNSW) nearest-neighbor algorithm, which efficiently indexes UAVs.

In an example embodiment, arbitrary sequences of activities are consumed across domains/channels of users of a social networking service, and these sequences are quantified into a vector of d dimensions, one in which various intents can be predicted at scale. For example, based on raw activity logs and site sessions, an example embodiment can predict that a given user has job interest in marketing and business development, a learning interest of "growth mindset" and "negotiation skills", and a people connect interest to connect to others in the media industry. This may be predicted using a variable length of context (e.g., last two days, last week, last year) of activities, so that both short-term and long-term interests can be obtained.

In an example embodiment, a user activity understanding and intelligence framework is provided to create a unified activity sequence of member activity across verticals; allow for understanding of these activity sequences to create compact representations and scalable model libraries; make these representations available for consumption via libraries, pretrained models, and ready-to-user presentations; and enable personalization in multiple downstream artificial intelligence tasks, by plugging in artifacts.

Specifically, the application server module 214 may additionally include an optional unified activity intelligence component 319 that obtains user activity data 320A, 320B, 320C. The user activity data 320A, 320B, 320C is from different channels within the social networking service. For example, user activity data 320A is from a careers channel, user activity data 320B is from a learning channel, and user activity data 320C is from a feed channel. While activity data from these three channels are depicted here, one of ordinary skill in the art will recognize that the user activity data can be from any number of different channels.

The unified activity intelligence component 319 aggregates the user activity data 320A, 320B, 320C and enriches the activity data with additional information. In an example embodiment, the type of the user interaction is one of the pieces of additional information used to enrich the activity data. For example, if the user activity information includes an interaction with the graphical user interface in which the user viewed a job listing, the user interaction type "viewed" may be added to the user activity information. Likewise, if the user activity information includes an interaction with the graphical user interface in which the user applied for a job associated with the job listing, the user interaction type "applied" may be added to the user activity information. Another example of information that can be used to enrich the activity data is information about the device (e.g., desktop or mobile) used to perform the interaction, or time-based information, such as the time of day when the interaction was performed.

The additional information with which to enrich the activity data is configurable based on channel, even at the individual type level. For example, not only is the decision as to whether to enrich the activity data with the type of the interaction configurable based on the channel, but so too are what types are available to classify the types of interaction and the entities to which the interaction applied. For example, in the career channel, action types may include view, search, and apply, and the entities involved include company identification, job title, and skill identification. In the learning channel, for example, the action types may include view course, complete course, view video, complete video, and search query while the entities may include course identification, topic identification, and skill identification. In the feed channel, for example, the action types may include react, like, share, comment, connect, follow, and send message, while the entities may include user title, hashtags, and topic identification.

Once these enriching annotations are defined, they may be joined with raw timestamps from the activity data to enrich a particular site action. They may then be aligned and ordered in order to obtain a unified view of a user's actions in a given session.

The unified activity intelligence component 319 may also execute custom sessionization logic to sessionize the data. The customization may include defining an idle time for a session boundary, and this customization may also vary based on the channel. The idle time is an indication of how long of an idle time is used to define when one session ends and another begins. For example, an idle time of five minutes will mean each time a user is idle for greater than five minutes, a new session is formed. The idle time may be set by an administrator, but can be customized for each channel. For example, a feed session may have a longer idle time than a careers session, as users may often become distracted with other things while performing a feed session but are still engaging in the same session when they return.

The result output by the unified activity intelligence component 319 may include one or more unified activity sessions (UASs).

An inference module 322 may then utilize an intent model 324 to perform inference for session embedding. Specifically, the intent model 324 creates a member activity vector for each combination of user and session. A pooling module 326 may then pool together various combinations of member activity vectors. For example, multiple member activity vectors for the same user can be pooled to create short-term or long-term intent vectors. The short-term intent vectors may combine member activity vectors for the most recent h sessions, where h is an integer that is preconfigured. The long-term intent vectors may combine member activity vectors for the most recent n sessions, where n is greater than h. The result is a set of pooled Unified Activity Vectors (UAVs), which can be stored in the online activity store 314 and the offline activity state store 302.

Figure 7:
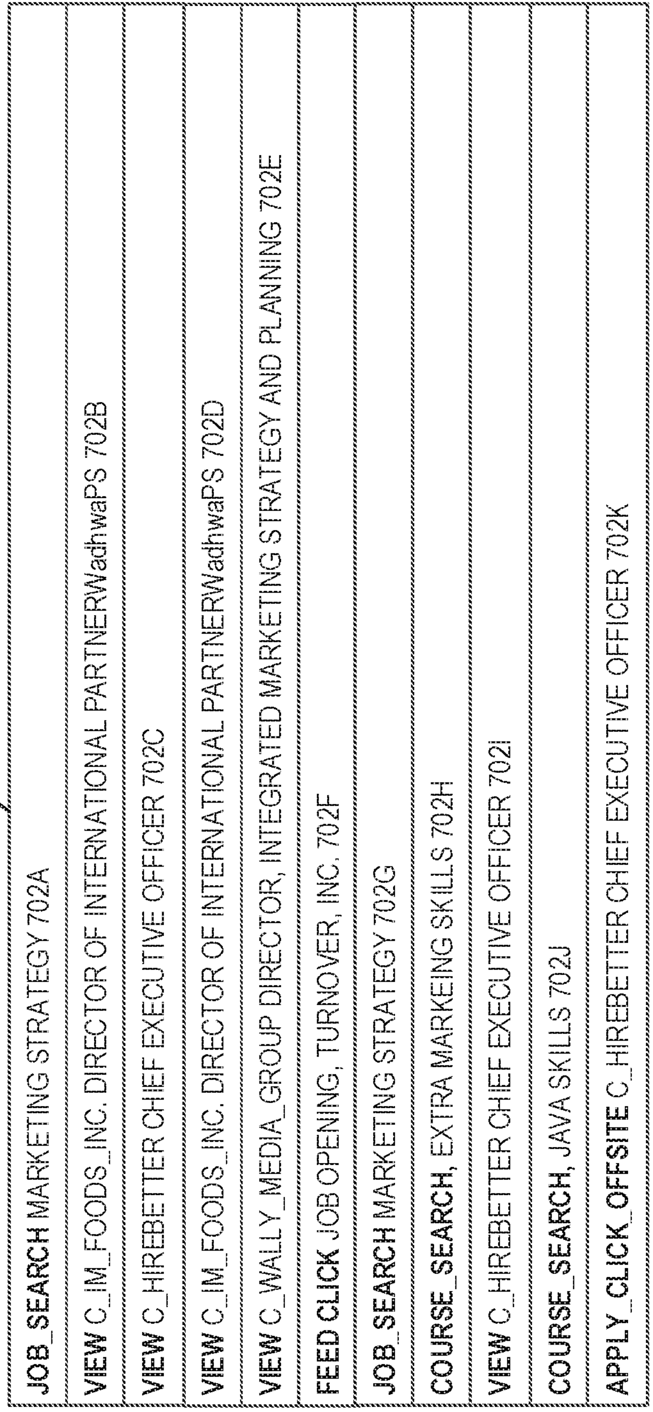
FIG. 7 is a diagram illustrating an example Unified Activity Vector (UAV) in accordance with the example embodiment.

FIG. 7 is a diagram illustrating an example UAS 700 in accordance with the example embodiment. Here, the session was defined as all interactions with a social networking service via a graphical user interface until 30 minutes of inactivity. In this example, the user has performed eleven such interactions 702A-702K, which are stored as array elements of a one-dimensional array in the UAS (for readability the interactions are depicted on different lines, but at the storage level the entire UAS would be a single one-dimensional array).

Figure 8:
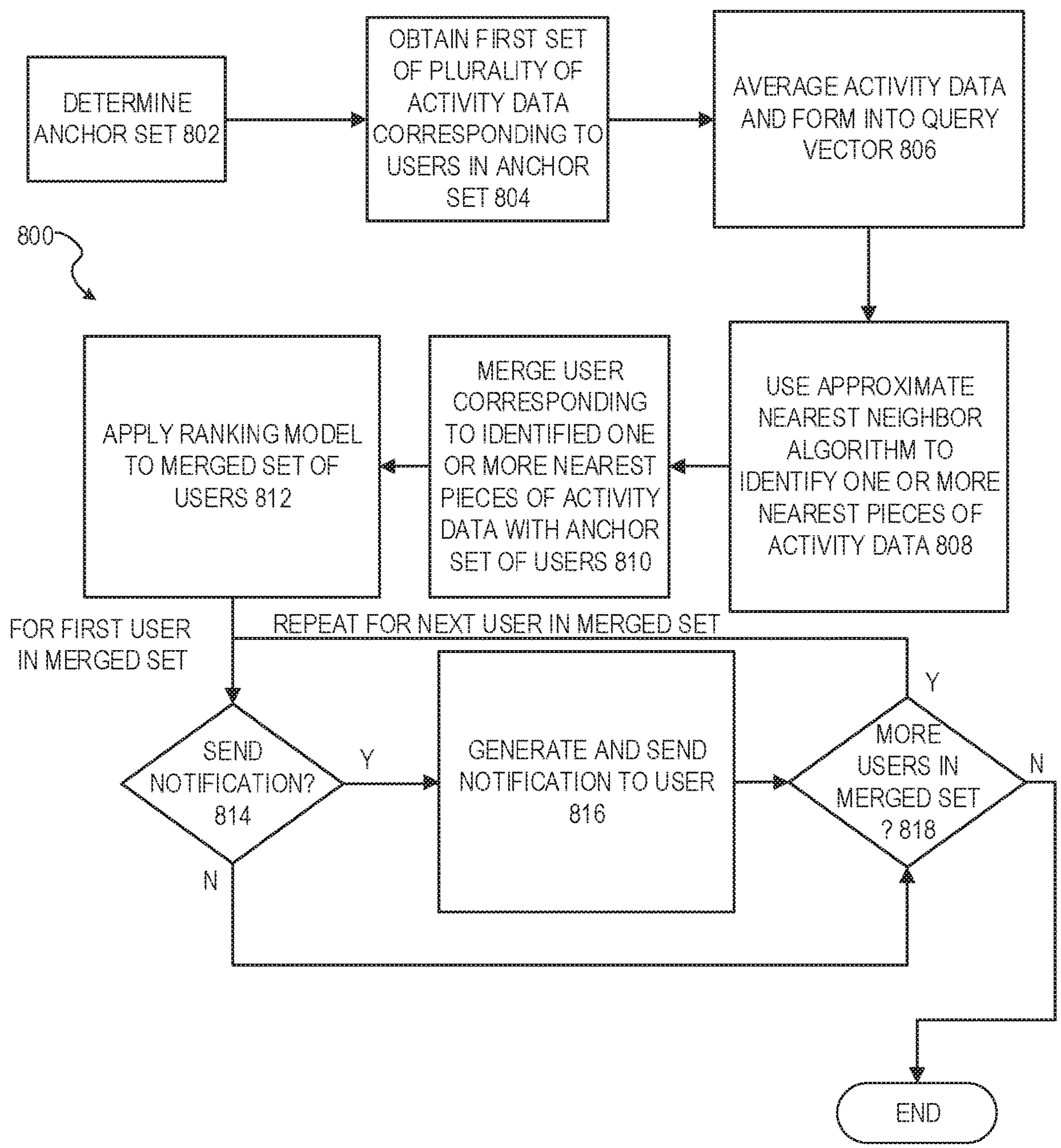
FIG. 8 is a flow diagram illustrating a method for sending a notification about a job listing posted in an online network to one or more users of the online network, in accordance with an example embodiment.

FIG. 8 is a flow diagram illustrating a method 800 for sending a notification about a job listing posted in an online network to one or more users of the online network, in accordance with an example embodiment. At operation 802, an anchor set of one or more users is determined by identifying users having user profiles with one or more attributes that match one or more attributes of the job listing. At operation 804, a first set of a plurality of activity data corresponding to users in the anchor set is obtained. These pieces of activity data contain information about user interactions with at least two separate channels of the online network. At operation 806, the activity data are averaged and formed into a query vector. At operation 808, an approximate nearest neighbor algorithm is used to identify one or more nearest pieces of activity data, from a plurality of activity data different than the first set, to the query vector. At operation 810, users corresponding to the identified one or more nearest pieces of activity data are merged with the anchor set of users to form a merged set of users. At operation 812, a ranking model is applied to the merged set of users, producing a ranking score for each user in the merged set of users. A loop is then begun for each user in the merged set of users. At operation 814, it is determined whether or not to send a notification to the user based on the ranking score for the user. In one example embodiment this is based on the ranking score exceeding a preset threshold. In another example embodiment, this is based on the ranking score being within a top preset number of ranking scores. If so, then at operation 816 a notification of the job listing is sent to the user. Then, or if at operation 814 it is determined that the user should not be sent the notification, it is determined at operation 818 if there are any more users in the merged set of users. If so, then the method 800 loops back to operation 814 for the next user in the merged set of users. If not, the method 800 ends.

Figure 9:
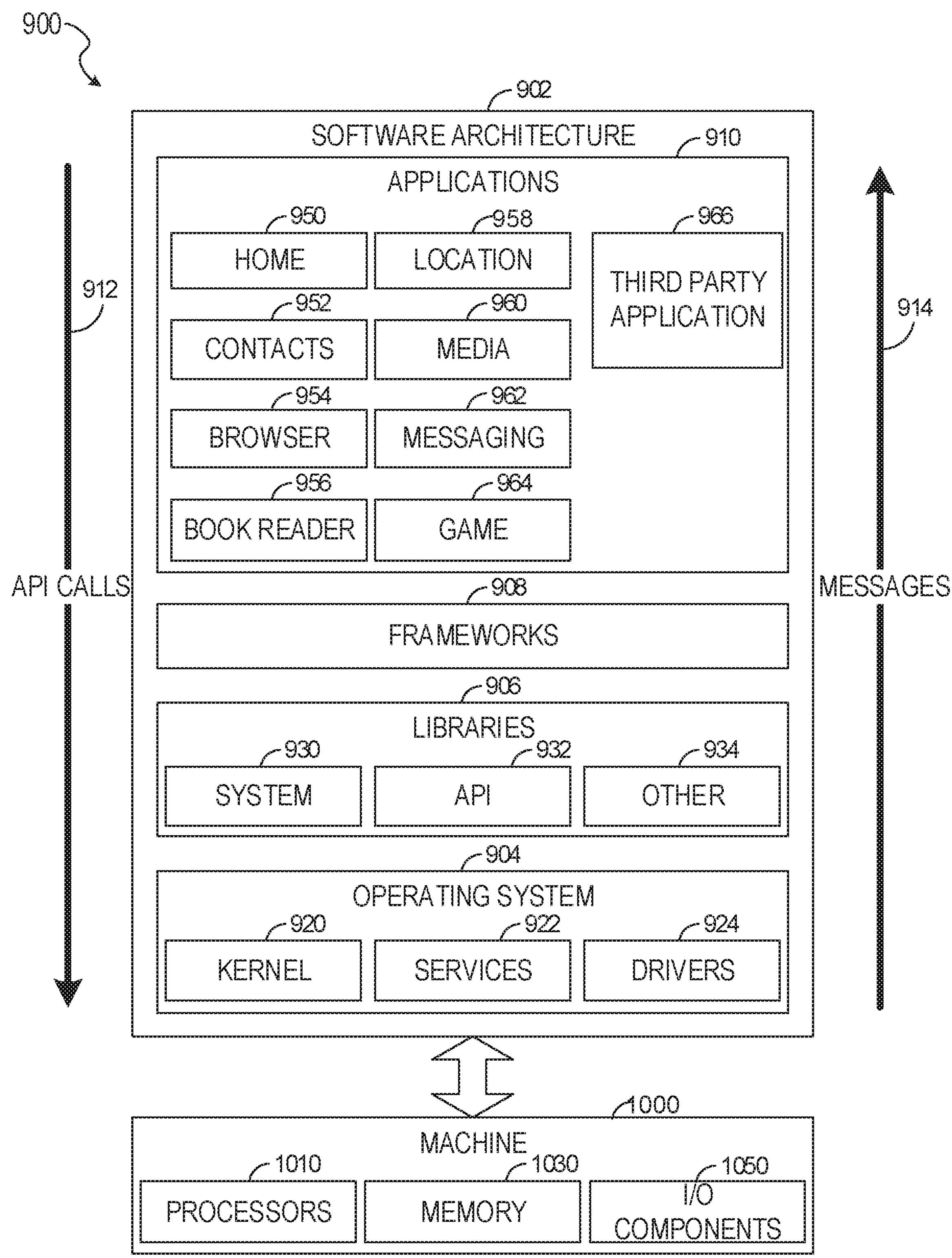
FIG. 9 is a block diagram illustrating a software architecture, in accordance with an example embodiment.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
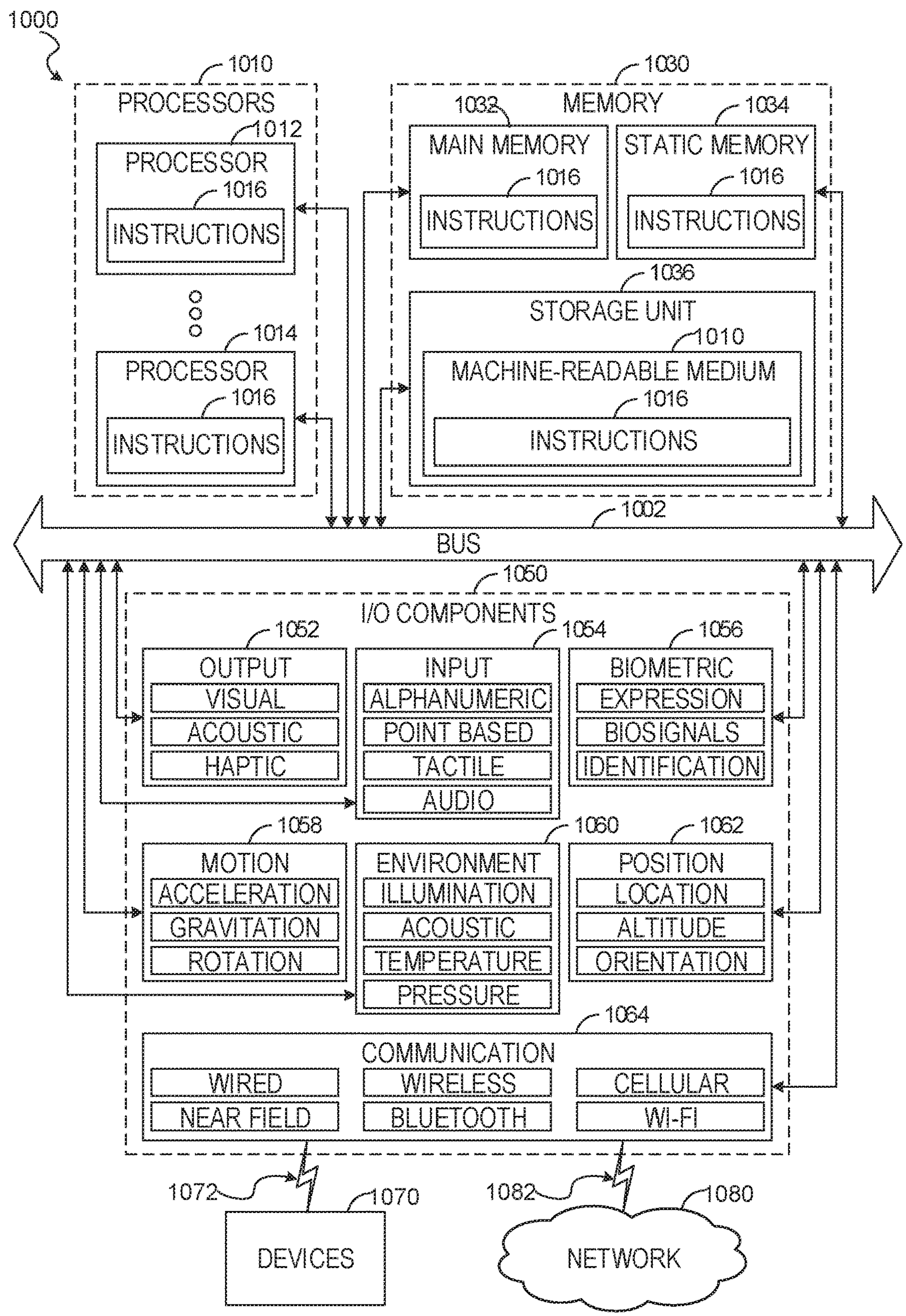
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein may be executed. For example, the instructions 1016 may cause the machine 1000 to execute the method 800 of FIG. 8. Additionally, or alternatively, the instructions 1016 may implement FIGS. 1-8, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors 1012 (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor), multiple processors 1010 with a single core, multiple processors 1010 with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1016 and/or data. The terms shall accordingly be taken to include, but not be limited to, solid-state memories, and optical and magnetic media, including memory internal or external to the processors 1010. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

a non-transitory computer-readable medium having instructions stored thereon, which, when executed by a processor, cause the system to perform operations comprising:

receiving a piece of content posted in an online network;

obtaining a first set of a plurality of activity data corresponding to a first set of a plurality of users of the online network, the first set of users identified based on matching one or more attribute within the piece of content based on a matching criteria;

averaging the first set of the plurality of activity data to create a query vector;

feeding the query vector into an approximate nearest neighbor algorithm to identify one or more nearest pieces of activity data, from a plurality of activity data different than the first set of the plurality of activity data;

merging a second set of users corresponding to the identified one or more nearest pieces of activity data with the first set of users, to form a merged set of users, the second set of users not having been matched to the one or more attribute based on the matching criteria;

applying a ranking model to the merged set of users; and based on the results of the ranking model, generating and sending a notification of the piece of content to one or more users in the merged set of users.

2. The system of claim 1, wherein the ranking model is a machine learned model trained to output a utility score for one or more users, the utility score indicative of a probability that a user will interact via a graphical user interface with the piece of content if presented with it.

3. The system of claim 1, wherein the approximate nearest neighbor algorithm is a Hierarchical Navigable Small World (HNSW) nearest-neighbor algorithm.

4. The system of claim 1, wherein the ranking model is an XGBoost algorithm.

5. The system of claim 1, wherein the ranking model is a neural network.

6. The system of claim 1, wherein the ranking model produces a score for each user of the merged set of users, and the generating and sending is performed for a user whose score exceeds a predetermined threshold.

7. The system of claim 1, wherein the ranking model produces a rank for each user of the merged set of users, and the generating and sending is performed for a user whose rank exceeds a predetermined threshold.

8. The system of claim 1, wherein the first set of the plurality of activity data include activity information generated from user interactions with a plurality of different channels of the online network.

9. The system of claim 8, wherein at least one piece of the activity information generated from user interactions with a first channel is enriched with information corresponding to the first channel and at least one piece of the activity information generated from user interactions with a second channel is enriched with information corresponding to the second channel.

10. The system of claim 9, wherein the operations further comprise performing sessionization of the enriched activity information.

11. The system of claim 1, wherein the piece of content is a job listing and the ranking model is trained to output a utility score for one or more users, the utility score indicative of a probability that a user will apply for a job associated with the job listing via a graphical user interface if presented with the job listing.

12. The system of claim 1, wherein the generating and sending a notification of the piece of content to one or more users in the merged set of users are only performed for users whose utility score transgressed a preset threshold.

13. A computerized method comprising:
- receiving a piece of content posted in an online network;
- obtaining a first set of a plurality of activity data corresponding to a first set of a plurality of users of the online network, the first set of users identified based on matching one or more attribute within the piece of content based on a matching criteria;
- averaging the first set of the plurality of activity data to create a query vector;
- feeding the query vector into an approximate nearest neighbor algorithm to identify one or more nearest pieces of activity data, from a plurality of activity data different than the first set of the plurality of activity data;
- merging a second set of users corresponding to the identified one or more nearest pieces of activity data with the first set of users, to form a merged set of users, the second set of users not having been matched to the one or more attribute based on the matching criteria;
- applying a ranking model to the merged set of users; and
- based on the results of the ranking model, generating and sending a notification of the piece of content to one or more users in the merged set of users.

14. The method of claim 13, wherein the ranking model is a machine learned model trained to output a utility score for one or more users, the utility score indicative of a probability that a user will interact via a graphical user interface with the piece of content if presented with it.

15. The method of claim 13, wherein the approximate nearest neighbor algorithm is a Hierarchical Navigable Small World (HNSW) nearest-neighbor algorithm.

16. The method of claim 13, wherein the ranking model is an XGBoost algorithm.

17. The method of claim 13, wherein the ranking model is a neural network.

18. The method of claim 13, wherein the ranking model produces a score for each user of the merged set of users, and the generating and sending is performed for a user whose score exceeds a predetermined threshold.

19. A non-transitory machine-readable storage medium comprising instructions which, when implemented by one or more machines, cause the one or more machines to perform operations comprising:
- receiving a piece of content posted in an online network;
- obtaining a first set of a plurality of activity data corresponding to a first set of a plurality of users of the online network, the first set of users identified based on matching one or more attribute within the piece of content based on a matching criteria;
- averaging the first set of the plurality of activity data to create a query vector;
- feeding the query vector into an approximate nearest neighbor algorithm to identify one or more nearest pieces of activity data, from a plurality of activity data different than the first set of the plurality of activity data;
- merging a second set of users corresponding to the identified one or more nearest pieces of activity data with the first set of users, to form a merged set of users, the second set of users not having been matched to the one or more attribute based on the matching criteria;
- applying a ranking model to the merged set of users; and
- based on the results of the ranking model, generating and sending a notification of the piece of content to one or more users in the merged set of users.

20. The non-transitory computer readable medium of claim 19, wherein the ranking model is a machine learned model trained to output a utility score for one or more users, the utility score indicative of a probability that a user will interact via a graphical user interface with the piece of content if presented with it.

21. The non-transitory computer readable medium of claim 19, wherein the approximate nearest neighbor algorithm is a Hierarchical Navigable Small World (HNSW) nearest-neighbor algorithm.

* * * * *